UNITED STATES PATENT OFFICE.

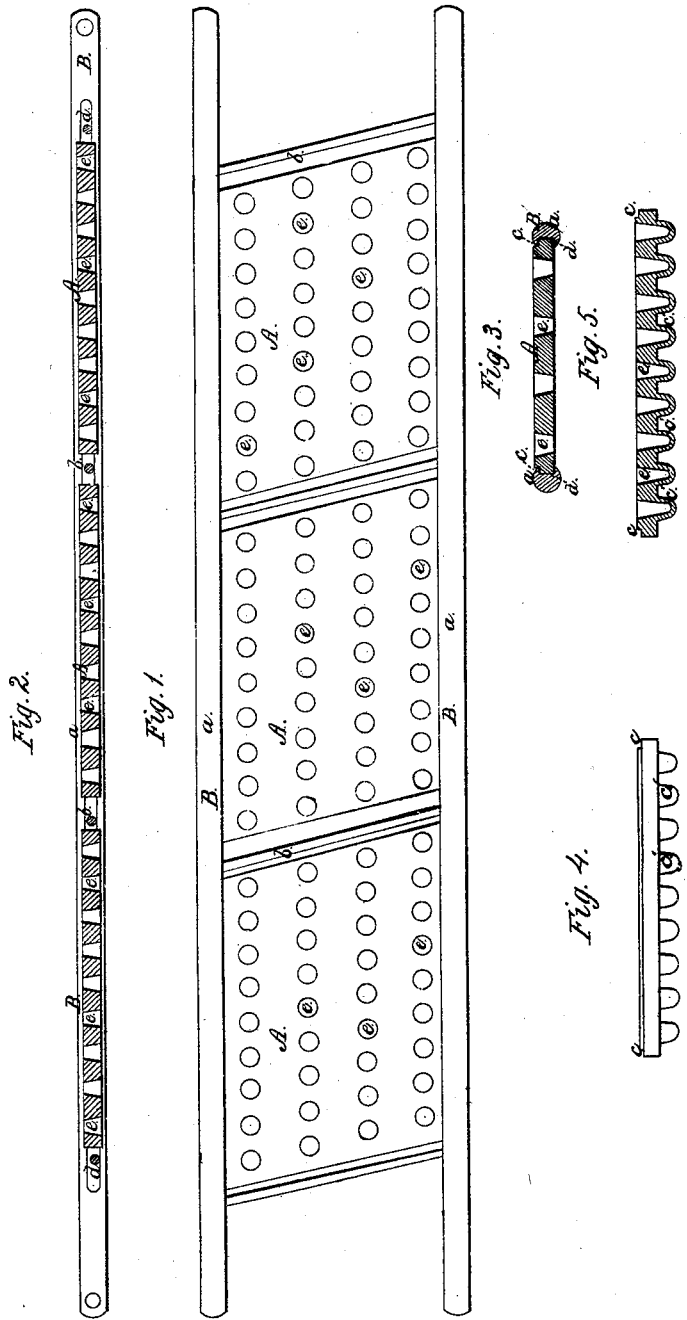

ALFRED B. COREY, OF FRANKLIN, CONNECTICUT.

WARP-DRESSING GUIDE.

Specification of Letters Patent No. 21,488, dated September 14, 1858.

*To all whom it may concern:*

Be it known that I, ALFRED B. COREY, of Franklin, in the county of New London and State of Connecticut, have invented a new Warp-Dresser Guide, and do hereby declare that the same is fully described and represented in the following specification and the accompanying drawings, of which—

Figure 1, is a front view. Fig. 2, a horizontal section of three of the said dresser guides, and a frame for containing the same. Fig. 3, is a transverse section of the same taken in range of four of the holes of one of the guides. Fig. 4, is a top view and Fig. 5, a horizontal section of one of the dresser guides as it appears when molded or cast and preparatory to the reduction or removal of its burs or nipples by the grinding process.

Heretofore it has been the custom to make the guides of warp dressing machines of a copper or metallic plate, having yarn holes or eyes bored or stamped in it. The great objection to a metallic guide plate is to be found in its liability to oxidation and wear while it is in use. In consequence of the sizing or dressing material being generally more or less acid the holes or eyes of the guide plates during the process of dressing the yarns, and while they are being drawn through the said holes, soon become cut, worn, and eaten down so as materially to affect the correct operations of the machine as well as to injure the yarn.

It is very essential that each guide hole or eye of the plate shall possess a very smooth bore or inner surface and that such shall maintain its primitive or cylindrical or conical form as long as possible. To this end I make the guide plate of glass porcelain or some proper mineral substitute capable of not only resisting acids as well as wear by the passage of the wet yarns through its guide holes but of being molded or formed in a mold with very smooth surfaces particularly as respects those of its guide holes.

In the Figs. 1 and 2 of the drawings A, A, A, represent three of such guide plates arranged in a frame B, composed of two grooved bars $a, a$, connected by cross rods $b, b$, each plate being formed with a tongue $c$, on its upper and lower edge to enter and fit the corresponding groove $d$, formed in the bar of the frame. Furthermore each plate or guide is constructed with a series of holes or eyes $e, e$, extending through it and for the purpose of receiving and guiding the yarns of a warp dresser. In manufacturing each guide plate I prefer to make it of glass, and to accomplish the same in a mold by pressure, and I make use of a mold whose bed-plate is formed with a series of cavities extending down from its upper surface and to receive a series of conical cores or projections extending from the lower surface of the plunger made to fit the chamber of the mold and capable of sliding toward and away from the bed plate. I do not form each cavity as a hole extending entirely through the bed plate but have such cavity closed at bottom and open at top so that when the article or guide is molded or made in the mold it shall be formed with a series of hollow projections extending from it as seen at $c', c'$, in Figs. 4 and 5, each of said hollow projections extending beyond and axially with a hole formed in the article by one of the cores of the plunger, such cores being made of steel or metal and with very smooth outer surfaces in order that the bore or inner surface of each guide hole through the plate may be formed very smooth. A guide blank so made in the mold in order to be converted into a warp dresser guide should consequently have all its hollow nipples or projections reduced or ground away from it. In this way very perfect guide holes will be formed in the plate each having the form of a frustum of a cone. A guide plate so made is capable of resisting wear and cannot be corroded or elongated downward by the acid of the dressing composition or material. Furthermore, when applied together in short sections or separate parts A, A, in one frame they are not liable to be broken or cracked by ordinary pressure exerted against the frame while the plate is in use. And when a warp dresser guide is made in several separate sections instead of one long piece as the notched guides are generally constructed and each is applied to its frame in manner as above described some one or more of the sections may be removed and the remaining sections may be adjusted in the frame as occasion may require. This will be found of great advantage in fitting the guide for various warps, whatever may be the number of yarns in each.

My invention or new manufacture of warp dresser guide is one of great value to those who use warp dressing machines. In no way can a glass guide be formed to be practically and economically useful in comparison with the ordinary metallic guides except by the process of molding essentially as above described. Were each guide hole to be made by the well known process of drilling it through a plate of glass the time and labor required for to so make a warp dresser guide, would be altogether too much, in an economical point of view and besides this the uncertainty of producing perfect holes is too great as in case one hole should be spoiled or injured in the course of drilling it, the plate would be rendered useless. By the process of molding the plate with cavities and hollow projections or their equivalents and subsequently grinding down or reducing said projections as above described, we are enabled to form perfect and smooth holes through the plate, and produce a new or improved manufacture of warp dresser guides, one invaluable to cotton manufacturers, each hole at its smaller or discharging end being made with great accuracy and perhaps only requires a very little reaming at such end in order to perfect it.

I claim—

1. A new or improved manufacture of warp dresser guide made of glass or its equivalent and by molding it on smooth cores and subsequently reducing the plate or the burs or projections made by the cores substantially as described.

2. I also claim making a warp dresser guide in several separate sections A, A, combined and applied in one frame essentially as and for the purpose hereinbefore explained In testimony whereof I have hereunto set my signature this twentieth day of August A. D. 1858.

ALFRED B. COREY.

Witnesses:
R. H. Eddy,
F. P. Hale, Jr.